United States Patent
Vogler et al.

(10) Patent No.: US 12,071,549 B2
(45) Date of Patent: Aug. 27, 2024

(54) PROCESS FOR CONTROLLING THE POROSITY OF CARBON BLACKS

(71) Applicant: ORION ENGINEERED CARBONS GMBH, Frankfurt am Main (DE)

(72) Inventors: Conny Vogler, Ruppichteroth (DE); Eddy Timmermans, Hürth (DE); Arndt-Peter Schinkel, Marienhausen (DE)

(73) Assignee: ORION ENGINEERED CARBONS IP GMBH & CO. KG, Monheim (DE)

( * ) Notice: Subject to any disclaimer, the term of this patent is extended or adjusted under 35 U.S.C. 154(b) by 468 days.

(21) Appl. No.: 17/130,276

(22) Filed: Dec. 22, 2020

(65) Prior Publication Data
US 2021/0108085 A1    Apr. 15, 2021

Related U.S. Application Data

(62) Division of application No. 15/506,797, filed as application No. PCT/EP2015/069720 on Aug. 28, 2015, now Pat. No. 10,907,049.

(30) Foreign Application Priority Data

Aug. 29, 2014 (EP) .................................. 14182786

(51) Int. Cl.
| | | |
|---|---|---|
| C09C 1/50 | (2006.01) | |
| B01D 46/00 | (2022.01) | |
| B01D 53/047 | (2006.01) | |
| B01D 53/22 | (2006.01) | |
| F23J 15/00 | (2006.01) | |
| C08L 21/00 | (2006.01) | |

(52) U.S. Cl.
CPC ............... *C09C 1/50* (2013.01); *B01D 46/00* (2013.01); *B01D 53/047* (2013.01); *B01D 53/22* (2013.01); *F23J 15/00* (2013.01); B01D 2253/102 (2013.01); B01D 2256/10 (2013.01); B01D 2257/104 (2013.01); C01P 2006/12 (2013.01); C01P 2006/19 (2013.01); C08K 2201/006 (2013.01); C08L 21/00 (2013.01); F23J 2217/60 (2013.01)

(58) Field of Classification Search
CPC ....................................................... C09C 1/50
See application file for complete search history.

(56) References Cited

U.S. PATENT DOCUMENTS

| | | | |
|---|---|---|---|
| 3,438,732 A | 4/1969 | Morel | |
| 3,438,783 A | 4/1969 | Machlin | |
| 3,475,125 A | 10/1969 | Krejci | |
| 3,615,210 A | 10/1971 | Jordan | |
| 3,619,138 A | 11/1971 | Gunnell | |
| 3,887,690 A | 6/1975 | West et al. | |
| 3,984,528 A | 10/1976 | Cheng | |
| 3,998,934 A | 12/1976 | Vanderveen | |
| 4,088,741 A | 5/1978 | Takewell | |
| 4,294,814 A | 10/1981 | Cheng | |
| 4,460,558 A * | 7/1984 | Johnson | .................. C09C 1/487 423/449.5 |
| 5,102,432 A | 4/1992 | Prasad | |
| 6,099,818 A | 8/2000 | Fruend et al. | |
| 6,277,350 B1 | 8/2001 | Gerspacher | |
| 6,391,274 B1 | 5/2002 | Vogler et al. | |
| 7,097,822 B1 * | 8/2006 | Godal | ....................... C01B 3/24 423/450 |
| 7,655,209 B2 | 2/2010 | Rumpf et al. | |
| 8,735,488 B2 | 5/2014 | Pelster et al. | |
| 10,829,613 B2 | 11/2020 | Schwaiger et al. | |

(Continued)

FOREIGN PATENT DOCUMENTS

| | | |
|---|---|---|
| BR | 112015022875 A2 | 7/2017 |
| CA | 2 342 928 A1 | 3/2000 |

(Continued)

OTHER PUBLICATIONS

Office Action dated Jan. 5, 2021, relative to Japanese Patent Application JP 2019-199564, 6 pages (with English translation, 6 pages).

(Continued)

*Primary Examiner* — Stuart L Hendrickson

(74) *Attorney, Agent, or Firm* — Smith, Gambrell & Russell, LLP

(57) ABSTRACT

The present invention relates to a furnace black having a STSA surface area of at 130 m$^2$/g to 350 m$^2$/g wherein the ratio of BET surface area to STSA surface area is less than 1.1 if the STSA surface area is in the range of 130 m$^2$/g to 150 m$^2$/g, the ratio of BET surface area to STSA surface area is less than 1.2 if the STSA surface area is greater than 150 m$^2$/g to 180 m$^2$/g, the ratio of BET surface area to STSA surface area is less than 1.3 if the STSA surface area is greater than 180 m$^2$/g; and the STSA surface area and the BET surface area are measured according to ASTM D 6556 and to a furnace process wherein the stoichiometric ratio of combustible material to $O_2$ when forming a combustion gas stream is adjusted to obtain a k factor of less than 1.2 and the inert gas concentration in the reactor is increased while limiting the $CO_2$ amount fed to the reactor. Also provided is an apparatus for conducting the process according to the present invention.

4 Claims, 1 Drawing Sheet

(56) References Cited

U.S. PATENT DOCUMENTS

| | | |
|---|---|---|
| 2002/0090325 A1 | 7/2002 | Hasegawa et al. |
| 2004/0248731 A1 | 12/2004 | Vogel et al. |
| 2005/0100502 A1 | 5/2005 | Krauss et al. |
| 2006/0201380 A1 | 9/2006 | Kowalski et al. |
| 2009/0035210 A1 | 2/2009 | Krauss et al. |
| 2009/0208751 A1 | 8/2009 | Green et al. |
| 2011/0207872 A1 | 8/2011 | Schinkel et al. |
| 2011/0236816 A1 | 9/2011 | Stanyschöfsky et al. |
| 2013/0295462 A1 | 11/2013 | Atanassova et al. |
| 2014/0162064 A1 | 6/2014 | Dikan et al. |
| 2016/0024270 A1 | 1/2016 | Schwaiger et al. |

FOREIGN PATENT DOCUMENTS

| | | |
|---|---|---|
| CN | 1317037 A | 10/2001 |
| CN | 1626583 A | 6/2005 |
| CN | 102471608 A | 5/2012 |
| CN | 105143356 A | 12/2015 |
| DE | 3111913 A1 | 10/1982 |
| DE | 195 21 565 | 1/1997 |
| DE | 195 21 565 A1 | 1/1997 |
| DE | 103 51 737 A1 | 6/2005 |
| EP | 0 982 378 A1 | 3/2000 |
| EP | 1 078 959 | 2/2001 |
| EP | 1 529 818 A1 | 5/2005 |
| EP | 2 361 954 A1 | 8/2011 |
| EP | 2 778 202 A1 | 9/2014 |
| JP | S47-031893 | 11/1972 |
| JP | H01-115439 | 5/1989 |
| JP | H06-313123 A | 11/1994 |
| JP | H07-102185 A | 4/1995 |
| JP | H09-012921 | 1/1997 |
| JP | H10-038215 A | 2/1998 |
| JP | 2001-123091 | 5/2001 |
| JP | 2001-139840 | 5/2001 |
| JP | 2001-139841 | 5/2001 |
| JP | 2001-226610 | 8/2001 |
| JP | 2001-342378 A | 12/2001 |
| JP | 2005-264140 A | 9/2005 |
| JP | 2008-524400 A | 7/2008 |
| JP | 2009-221262 A | 10/2009 |
| JP | 2012-505939 A | 3/2012 |
| RU | 2 035 981 C1 | 5/1995 |
| WO | 00/14162 A1 | 3/2000 |
| WO | 2006/066132 A2 | 6/2006 |
| WO | 2011/018887 A1 | 2/2011 |
| WO | 2013/096784 A1 | 6/2013 |
| WO | 2014/012002 A2 | 1/2014 |
| WO | 2014/140228 A1 | 9/2014 |

OTHER PUBLICATIONS

Office Action dated Oct. 15, 2021, relative to Chinese Patent Application CN 202110269993, 6 pages (with English translation, 7 pages).

Search Report dated Sep. 29, 2021, relative to Chinese Patent Application CN 202110269993, 1 page.

Office Action dated Apr. 28, 2020, relative to Japanese Patent Application JP 2017-511677, 5 pages (with English translation, 5 pages).

Office Action dated Jan. 5, 2021, relative to Japanese Patent Application JP 2017-511677, 3 pages (with English translation, 2 pages).

Communication for the Examining Division of European Patent Application No. 15 759 714.7 dated Oct. 20, 2021 (9 pages).

Search Report for European Patent Application No. 14 18 2786 dated Aug. 14, 2015 (1 page).

Office Action for Korean Patent Application No. KR 10-2017-7004544 dated Dec. 21, 2021, 14 pages (with English translation, 12 pages).

International Search Report for PCT/EP2015/069720, dated Dec. 3, 2015 in English Language (3 pages).

International Written Opinion for PCT/EP2015/069720, dated Dec. 3, 2015 in English Language (8 pages).

ASTM D-6556, Standard Test Method for Carbon Black—Total and External Surface Area by Nitrogen Adsorption, ASTM International, West Conshohocken, PA, 2014, pp. 1-5.

ASTM D-2414, Standard Test Method for Carbon Black—Oil Absorption Number (OAN), ASTM International, West Conshohocken, PA, 2013, pp. 457-464.

ASTM D-1510, Standard Test Method for Carbon Black—Iodine Adsorption Number, ASTM International, West Conshohocken, PA, 2013, pp. 1-10.

Donnet, et al., Carbon Black: Science and Technology ($2^{nd}$ ed.), New York, NY, Marcel Dekker, Inc., 1993, pp. 34-41.

Yu, et al., ПРОИЗВОДСТВО И ИСПОЛЬЗОВАНИЕ ТЕХНИЧЕСКОГО УГЛЕРОДА ДЛЯ РЕЗИН [Production and Use of Carbon Black for Rubber] .ЯРОСЛАВЛЬ [Yaroslavl] 2002, p. 170 (in Russian with English Translation).

Chinese Office Action (Second) mailed Nov. 9, 2018 for Chinese Patent Application No. 201580046535.5 (7 pages in Chinese with English Translation).

Japanese Office Action mailed Jun. 4, 2019 for Japanese Patent Application No. 2017-511677 (5 pages in Japanese with English Translation).

* cited by examiner

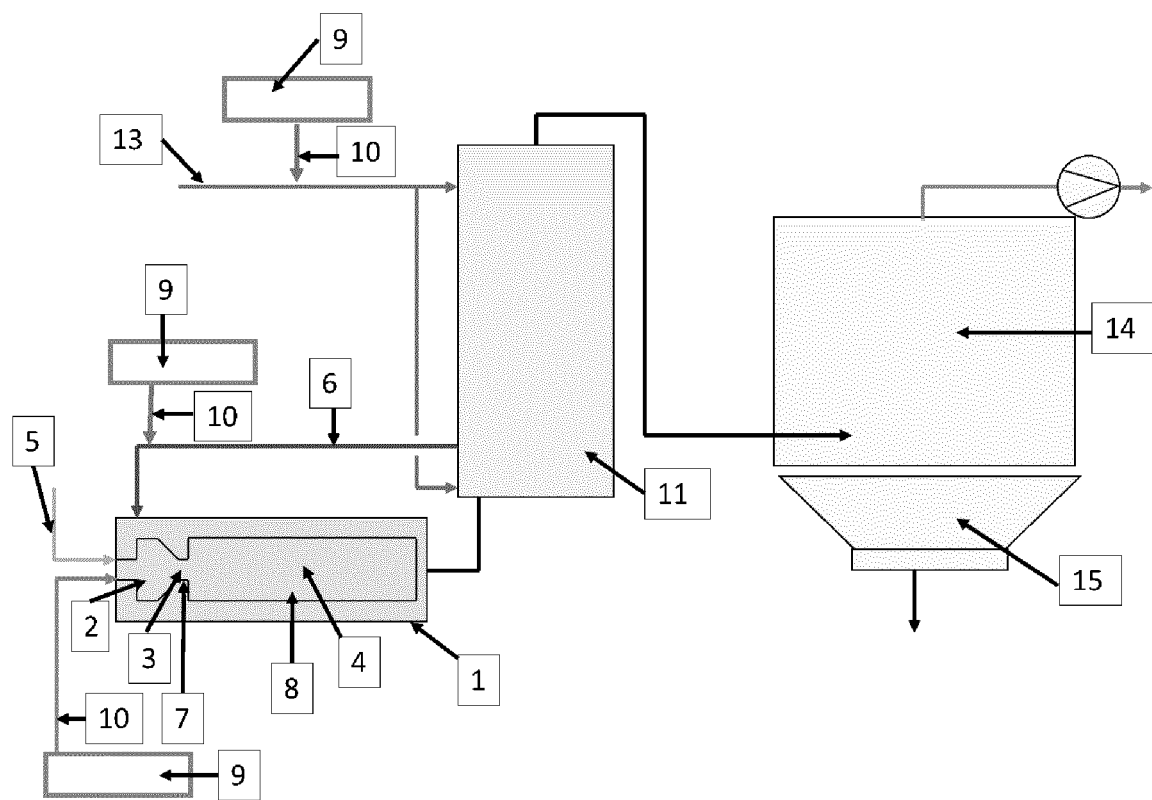

PROCESS FOR CONTROLLING THE POROSITY OF CARBON BLACKS

The present invention relates to a process for controlling the porosity of carbon blacks, to carbon blacks produced thereby and to an apparatus for performing the process of the present invention.

BACKGROUND OF THE INVENTION

According to the general knowledge of a person skilled in the art of carbon black, as exemplified by "Carbon Black" edited by Jean-Baptiste Donnet et al., second edition, Marcel Dekker, Inc., New York (1993), pages 35 to 39, in a furnace process for making carbon black the porosity of carbon black can be controlled by the quenching position of the furnace reactor. The earlier the freshly formed carbon black is quenched, the lower its porosity. The ratio of BET surface area to STSA surface area may be used as a measure for porosity. In case of blacks with fine particle size this ratio is equal to or slightly less than unity for very short quenched carbon blacks (no porosity) and greater than unity for those produced within longer quench distance. Very fine particle blacks always exhibit a certain amount of porosity since the quench can only be placed at fixed locations along the reactor. The optimum position may not always be available. As a consequence, the reaction may not be terminated at the precise moment at which the carbon black formation has just been completed. Furthermore, different residence times do not only affect porosity, but also the surface chemistry of the black. The surfaces of very short-quenched blacks are rich in hydrogen from CH groups or those groups which are similar to olefinic double bonds. These surface chemistries may not be desirable for all applications where carbon blacks commonly can be used.

In tire applications carbon blacks having high surface area and low porosity can improve the wear resistance of tires. On the other hand if furnace blacks are produced as described above with a short quench distance to achieve high surface area and low porosity the resultant surface chemistry particularly the olefinic surface groups lead to very short vulcanization times which impair the processability of the rubber compound.

Thus, there is still a need for a process for the production of carbon blacks wherein the porosity of the carbon black can be controlled, particularly reduced, in a furnace process independent of the quench position to avoid the above disadvantage of short quenched carbon blacks. There is also particularly a need for carbon blacks that show an improved balance of wear resistance and processability of the rubber compound in tire application.

According to the present invention the porosity of carbon blacks can be easily controlled, particularly reduced, in a furnace process by adjusting the stoichiometric ratio of combustible material to $O_2$ when forming a combustion gas stream to obtain a k factor of less than 1.2 in combination with increasing the inert gas concentration in the reactor while limiting the $CO_2$ amount fed to the reactor.

In the prior art, carbon black production processes using approximately stoichiometric combustion were proposed.

U.S. Pat. No. 3,475,125 describes a carbon black production process wherein in the reaction zone at least one stream of hot combustion gas is obtained by burning in a combustion zone a first combustible mixture of a hydrocarbon fuel and an oxidant, which contains substantially the stoichiometric amount of oxidant required for the burning of said fuel. That first combustible mixture is burned in presence of steam that is present in an amount sufficient to protect the refractory lining of said combustion zone from excessive temperature. Optionally, at least one other stream of hot combustion gases which is obtained by burning a second combustible mixture of hydrocarbon fuel and an oxidant containing an amount of oxidant, which is greater than the stoichiometric amount required for the burning of said fuel is applied to the reaction zone. It is described that this process leads to an increased yield of carbon black while protecting the refractories of the furnace from excessive temperatures.

U.S. Pat. No. 4,294,814 discloses a process for the production of carbon black with high structure by axially introducing a first stream of hydrocarbon feed, by circumferentially or tangentially introducing a second stream of hot combustion gases into the reactor so as to form a vortex of hot combustion gases around the first stream of hydrocarbon feed and by introducing a third stream of gas radially into the reactor. According to a preferred embodiment, one of the second and the third stream comprising combustion gases results from an under-stoichiometric ratio of combustible materials and oxygen whereas the other combustion gas stream results from an over-stoichiometric ratio of combustible material to oxygen so that when both combustion gas streams are combined overall stoichiometric conditions are achieved with very high temperatures in the center of the reactor wherein the first stream of hydrocarbon feed is fed to without contact to the reactor walls. According to the teaching of this prior art document, thereby a carbon black with very high structure can be obtained.

EP-A 982 378 relates to a furnace process for producing carbon black wherein a high-temperature combustion gas stream is formed and the oxygen concentration of the combustion gas at the point where the feedstock is introduced is at most 3 vol.-%. It is described that the advantage of making the oxygen concentration as small as possible is that the aggregate size of the carbon black is small and aggregates having a large particle size are suppressed. Furthermore, carbon blacks having a narrow particle size distribution are obtained by that process.

US 2002/0090325 addresses the problem of producing carbon black of smaller particle size and narrower aggregate size distribution by conducting perfect combustion of fuel at as high a temperature as possible and an air ratio close to 1 while restraining damage to the reactor wall refractory in the combustion section. Furthermore, in the prior art section of this reference a Japanese patent application No. 10-38215 is discussed that is not related to carbon black production. In this Japanese reference a burner combustion method is disclosed wherein the oxygen concentration is far lower than ordinary air at least immediately before the combustion reaction by using dilute air, e.g. by recycling exhaust gas or diluting the air with inert gas such as nitrogen. In US 2002/0090325 this concept has been considered as unsuitable for carbon black production since if applying such a method to a carbon black-producing furnace production of carbon black with stabilized quality may become difficult. In addition, diluting oxygen concentration requires extra cost for equipment. Thus, US 2002/0090325 proposes a furnace structure in which an air feed port or ports and a fuel feed port or ports are disposed independently, spaced apart from each other in the first reaction zone so that combustion air and fuel will be injected individually into the furnace and burned in the furnace. Thereby, carbon black of small particle size and narrow agglomerate size distribution is obtained and damage to the reactor wall refractory in the combustion section is minimized.

U.S. Pat. No. 7,655,209 relates to a so-called "deep fuel rich" process for producing carbon black wherein the reactor off-gas is used preferably without natural gas or other supplementary combustible gas feed streams with an oxidant gas stream providing oxygen in an amount of less than 80% of stoichiometry in order to generate a combustion gas. Preferably, the off-gas is preheated, dewatered and, if necessary, carbon dioxide is removed. The content of hydrogen and carbon monoxide in the reactor off-gas is thereby utilized as combustible material. The advantage of the process is that the economics of the entire process is improved due to a more complete use of the employed raw material, thereby considerably reducing the raw material costs. Despite the teaching in U.S. Pat. No. 7,665,209 to optionally remove carbon dioxide from the off-gas, utilizing hydrogen and carbon monoxide as predominant or sole combustible material will lead to an increased concentration of carbon dioxide in the generated combustion gas.

U.S. Pat. No. 3,438,732 discloses a process for the production of carbon black wherein the tail gases from the production process are treated to remove hydrogen, carbon monoxide and water and are subsequently recycled to the process, preferably as atomizing gas for the carbon black feedstock. There, the inert gas resulting from the tail gas substantially consists of nitrogen and carbon dioxide. Thereby, the carbon black yield relative to the carbon black feedstock material can be increased.

None of the above-discussed prior art documents addresses the problem of controlling the porosity, particularly reducing the porosity of the resultant carbon black. The only product parameter that is disclosed as being influenced by the process regime in some of the above-discussed prior art references is the influence of combustion stoichiometry on particle size and particle size distribution of the resultant carbon black.

Thus, it is the object of the present invention to provide a process for the production of carbon black that is suitable to control the porosity of the resultant carbon black, particularly to reduce the porosity of the carbon black.

It is a further object of the present invention to thereby simultaneously reduce the environmental impact of a carbon black production process. It is particularly beneficial if the concentration of gases detrimental to the environment like $NO_x$, $SO_x$ or $CO_2$ in the reactor off gas could be reduced.

SUMMARY OF THE INVENTION

These objects have been attained by a furnace process for the production of carbon black comprising:
  feeding an $O_2$-containing gas stream, a fuel stream comprising combustible material and optionally one or more further gas streams to a furnace reactor;
  subjecting the combustible material to combustion in a combustion step to provide a hot flue gas stream, wherein the $O_2$-containing gas stream, the fuel stream comprising combustible material and optionally the one or more further gas stream are fed to the combustion step in amounts providing a k factor of less than 1.2, wherein the k factor is defined as the ratio of $O_2$ theoretically necessary for stoichiometric combustion of all combustible material in the combustion step to the total $O_2$ fed to the combustion step;
  contacting a carbon black feed stock with the hot flue gas stream in a reaction step to form carbon black;
  terminating the carbon black formation reaction in a terminating step;
wherein the combined streams fed to the combustion step contain less than 20.5 vol.-% $O_2$ and less than 3.5 vol. % of carbon dioxide based on the total volume of gaseous components excluding combustible components fed to the combustion step; and/or
an inert gas stream comprising a combined amount of components selected from oxygen containing compounds of at most 16 vol.-% is fed to at least one of the reaction step and the terminating step.

Employing the process according to the present invention furnace blacks can be produced having an STSA surface area of 130 m²/g to 350 m²/g, wherein
  the ratio of BET surface area to STSA surface area is less than 1.1 if the STSA surface area is in the range of 130 m²/g to 150 m²/g,
  the ratio of BET surface area to STSA surface area is less than 1.2 if the STSA surface area is greater than 150 m²/g to 180 m²/g,
  the ratio of BET surface area to STSA surface area is less than 1.3 if the STSA surface area is greater than 180 m²/g; and
the STSA surface area and the BET surface area are measured according to ASTM D 6556.

Preferably, the furnace black of the present invention has a STSA surface area of 140 m²/g to 350 m²/g wherein
  the ratio of BET surface area to STSA surface area is less than 1.1, preferably less than 1.09 if the STSA surface area is in the range of 140 m²/g to 150 m²/g,
  the ratio of BET surface area to STSA surface area is less than 1.2, preferably less than 1.15 if the STSA surface area is greater than 150 m²/g to 180 m²/g,
  the ratio of BET surface area to STSA surface area is less than 1.3, preferably less than 1.25 if the STSA surface area is greater than 180 m²/g.

Furthermore, the present invention relates to an apparatus for running a preferred embodiment of the process according to the present invention comprising
  a) a furnace reactor comprising
    a first reaction zone for generating a hot flue gas stream and at least one line in flow connection with the first reaction zone for feeding an $O_2$-containing gas stream to the first reaction zone and at least one line in flow connection with the first reaction zone for feeding a fuel stream comprising combustible material to the first reaction zone;
    a second reaction zone for contacting the hot flue gas stream with the carbon black feed stock downstream of and in flow connection with the first reaction zone and at least one line in flow connection with the second reaction zone for feeding carbon black feed stock to the second reaction zone; and
    a third reaction zone for terminating the carbon black formation reaction downstream of and in flow connection with the second reaction zone comprising means for quenching the carbon black formation reaction; and
  b) an inert gas supply unit; and
  c) at least one line connecting the inert gas supply unit to the reactor or to any of the feeding lines for feeding material to the reactor in order to feed an inert gas stream to the reactor,
wherein the inert gas supply unit (9) is selected from a supply line connecting an external inert gas production facility to the apparatus, a storage unit (9) or an air separation unit (9).

DETAILED DESCRIPTION OF THE INVENTION

The present inventors realized that the porosity of a furnace black can be controlled by modifying the well-known furnace process.

In the process of the present invention an $O_2$-containing gas stream and a fuel stream comprising combustible material is fed to the combustion step in a furnace reactor. The fuel stream is subjected in the combustion step to combustion in order to provide a hot flue gas stream. The combustion step is conducted in a first reaction zone of the furnace reactor that may be referred to as the precombustion chamber. The hot flue gas stream thereby obtained has preferably a temperature in the range of 1,000 to 2,600° C., preferably 1,200 to 2,500° C., more preferred 1,300 to 2,400° C. and most preferred 1,500 to 2,100° C. The geometry of the precombustion chamber is not critical for the process of the present invention and depends on the type of reactor used for the process. The geometry can be varied as known by a person skilled in the art in order to adjust the process to other requirements that are not essential to the present invention. Examples of suitable combustors are given in EP2361954 A1, U.S. Pat. No. 6,391,274 B1,DE 19521565 A1, U.S. Pat. No. 8,735,488 B2.

Due to the high temperatures of the flue gas generated, the precombustion chamber is lined with appropriate refractory material that can be easily selected by a person skilled in the art depending on the temperatures that are obtained during the process of the present invention. Alternatively the reactor walls can be cooled by a gas or liquid stream.

As fuel stream according to the present invention any material can be used that is combustible. Preferably, the fuel stream comprises liquid and/or gaseous hydrocarbons, the fuel stream contains at least 50 wt-%, more preferred at least 70 wt-%, even more preferred at least 90 wt-%, and most preferred at least 95 wt.-% of hydrocarbons. Particularly preferred is the use of natural gas. Optionally, the fuel stream can be pre-heated prior to entry into the combustion zone.

As $O_2$-containing gas stream any gas stream can be used that comprises oxygen gas. Particularly suitable is air, oxygen-reduced or oxygen-enriched air.

According to the present invention, the $O_2$-containing gas stream, the fuel stream and optionally the inert gas stream are fed to the combustion step in the furnace reactor in amounts providing a k factor of less than 1.2, wherein the k factor is defined as the ratio of $O_2$ theoretically necessary for stoichiometric combustion of all combustible material in the fuel stream to the total $O_2$ in the combustion step. Preferably, the k factor is 0.15 to 1.2, more preferred 0.3 to 1.15, even more preferred 0.75 to 1.15, particularly preferred 0.85 to 1.1, and most preferred 0.95 to 1.05. The person skilled in the art will appreciate that the k factor can be easily calculated from the content and type of combustible material in the feed streams and the $O_2$ content of the streams to the reactor and their respective flow rates.

The upper limit of the $O_2$ content of the combined streams fed to the combustion step can be 20, 19.5, 19, 18.5, 18, 17.5, 17, 16.5, 16, 15.5, 15, 14.5, 14, 13.5 or 13 vol.-% based on the total volume of gaseous components excluding combustible components fed to the combustion step. The lower limit of the $O_2$ content of the combined streams fed to the combustion step can be 1.0, 1.5, 2, 2.5, 3, 3.5, 4, 4.5, 5, 5.5, or 6 vol.-% based on the total volume of gaseous components excluding combustible components fed to the combustion step. The upper limit of the $CO_2$ content of the combined streams fed to the combustion step can be less than 3, less than 2.5, less than 2.0, less than 1.5, less than 1.0, less than 0.5 vol. % based on the total volume of gaseous components excluding combustible components fed to the combustion step.

In the process according to the present invention the hot flue gas generated in the combustion step, i.e. the precombustion chamber, is contacted in a reaction step with the carbon black feedstock. In the reaction step pyrolysis of the carbon black feedstock takes place and carbon black is formed. According to the present invention, the cross-section of the furnace reactor in flow direction behind the first reaction zone or precombustion chamber can be reduced or expanded. The section of the reactor in flow direction behind the first reaction zone or precombustion chamber may form the second reaction zone where predominantly the carbon black-forming reaction occurs. The second reaction zone in general expands from the point where the first carbon black feed stock material enters the reactor to the point where the termination of the carbon black formation reaction as described in more detail below begins. The actual length and geometry of the second reaction zone can be varied in wide ranges depending on the type of reactor employed and the specific requirements of the process for the actually produced carbon black.

In general, the carbon black feedstock material can fed to the reaction step by any suitable means. The carbon black feedstock material can be injected radially, for example by using radial lances or axially by using one or more axial lances into the second reaction zone. Any suitable carbon-containing material known to the person skilled in the art as suitable for carbon black production can be employed. Suitable carbon black feedstock can be selected from liquid and gaseous hydrocarbons such as coal tar oils, steam cracker oils, catcracker oils, natural oils or natural gas. It is particularly useful to employ the above-mentioned liquid hydrocarbon-containing oils as carbon black feedstock material.

In the terminating step the carbon black formation reaction is terminated, Termination can be conducted downstream of the second reaction zone in a third reaction zone which is also referred to as quenching zone. Termination of the carbon black formation reaction can be achieved by any means known to the person skilled in the art. Thereby, the formed carbon black as well as the reactor off-gas are cooled and the carbon black formation reaction is terminated. Cooling can be achieved by direct or indirect heat exchange, for example by using cooled reactor walls, a quench boiler, or quenching. Preferably, quenching is achieved be injecting a suitable quench liquid. According to the present invention, it is also suitable that the cross-section of the furnace reactor in the quenching zone is increased compared to the second reaction zone. The quench liquid can be injected at various positions in the furnace reactor, depending on the desired properties of the carbon black to be produced. The quench liquid can be injected axially and/or radially at different positions of the reactor. Of course it is also possible to use any combination of the different possible injection points for the quench liquid. Preferably, water is used as a quench liquid.

A particular advantage of the present invention is that in order to produce low porosity carbon blacks the process is not restricted any longer to use quench positions in proximity of the second reaction zone. Thus, a wider range of carbon blacks having the desired properties, but still having a low porosity, can be produced since the porosity is not any longer determined only by the quench position, as is well known to a person skilled in the art, as discussed above in the introductory part.

The reaction mixture comprising the formed carbon black as well as the reactor off-gases after leaving the quenching zone of the reactor is preferably directed through a heat exchanger. Thereby, the reaction mixture is cooled to allow further processing such as separation of the formed carbon black from the reactor off-gas. Furthermore, in the heat exchanger the $O_2$-containing gas used for combusting the fuel stream can be preheated in order to increase the overall energy efficiency of the process. A single or multiple heat exchangers can be used in order to reduce the temperature of the reaction mixture to an appropriate level for further processing.

Subsequently, the reaction mixture is subjected to a gas/solid separation operation in order to separate the carbon black from the reactor off-gases. Typically, filters are used for separation of the carbon black from the reactor off-gases. Further treatment steps for the obtained carbon black and the reactor off-gas may follow.

The object of the present invention, as discussed above, is attained by compared to a standard furnace process adjusting the k factor to be less than 1.2 and increasing the inert gas concentration in the reactor while limiting the amount of $CO_2$ fed to the reactor.

This is achieved according to the present invention by feeding combined streams to the combustion step providing less than 20.5 vol.-% $O_2$ and less than 3.5 vol. % of carbon dioxide based on the total volume of gaseous components excluding combustible components fed to the combustion step. Alternatively an inert gas stream comprising a combined amount of components selected from oxygen containing compounds of at most 16 vol.-% is fed to at least one of the carbon black formation step and the terminating step. As understood by a person skilled in the art both measures can also be combined.

As inert gas any gas can be used that does not interfere with the carbon black production process at the reaction conditions prevailing within the reactor. Thus, the inert gas stream should comprise a combined amount of components selected from oxygen-containing compounds of at most 16 vol.-%. Suitable upper limits for the amount of oxygen-containing compounds, are at most 15% vol.-%, at most 14% vol.-%, at most 13% vol.-%, at most 12% vol.-%, at most 11% vol.-%, at most 10% vol.-%, at most 9% vol.-%, at most 8% vol.-%, at most 7% vol.-%, at most 6 vol.-%, at most 5 vol.-%, at most 4 vol.-% or at most 3 vol.-%. Lower limits of the amount of oxygen-containing compounds can be 0.01 vol.-%, 0.1 vol.-%, 0.3 vol.-%, 0.5 vol.-%, 1 vol.-% or 2 vol.-%. Particularly, the combined amount of molecular oxygen, any kind of oxidative compounds such as nitrogen oxides as well as water, carbon monoxide and carbon dioxide should be controlled to be below the specified levels. Suitable inert gases can be selected from $N_2$-containing gases comprising at least 84 vol.-% $N_2$; and ammonia. $N_2$-containing gases are particularly preferred to be used as inert gas. Suitable $N_2$-containing gases comprise 84-99.9999 vol.-% $N_2$, more preferred 90-99.99 vol.-% $N_2$, even more preferred 92-99.99 vol.-% $N_2$, most preferred 95-99 vol.-% $N_2$.

Since the reactor off-gas contains considerable amounts of water, CO and $CO_2$ the reactor off-gas can only be used as inert gas after all of these components have been removed below the above-described levels. This is in most cases economically unattractive. Therefore, it is preferred if the inert gas is not derived from the reactor off-gas.

According to the present invention, inert gas can be fed directly or indirectly to the combustion step, the reaction step, the termination step or any combinations thereof. For example, it is possible that the inert gas is combined with the $O_2$-containing gas stream either prior to preheating the $O_2$-containing gas stream in the heat exchanger or with the already preheated oxygen-containing gas stream. Alternatively the inert gas stream can be directly fed to the combustion step. It is also possible to introduce the inert gas to the reaction step for example by using it as atomizing gas for the carbon black feedstock. Of course also any combinations thereof can be employed. It is particularly preferred to combine the inert gas stream with the $O_2$-containing gas stream prior to preheating.

In case the inert gas stream contains $O_2$ and is fed directly or indirectly to the combustion step a person skilled in the art will appreciate that the $O_2$ introduced to the combustion step by the inert gas stream has to be considered when calculating the k-factor according to the present invention. Thus, an inert gas stream containing $O_2$ that is directly or indirectly fed to the first reaction zone can be at least part of the $O_2$-containing gas stream for generating the hot flue gases according to the present invention.

Instead of or in combination to feeding an inert gas stream to the reactor including all above described embodiments an $O_2$-containing gas stream having compared to air a reduced content of oxygen containing compounds can be fed to the combustion step. In this embodiment the $O_2$-containing gas stream fed to the combustion step comprises a combined amount of components selected from oxygen containing compounds of less than 20.5 vol.-%. Particularly the combined amount of molecular oxygen, any kind of oxidative compounds such as nitrogen oxides as well as water, carbon monoxide and carbon dioxide should be controlled to be below the specified levels. Of course the $O_2$ containing gas stream needs to contain sufficient oxygen to sustain combustion of the fuel stream and to obtain the k factor according to the present invention. Furthermore if the oxygen gas content is too low the process can be un-economical since then to high flow rates of the $O_2$-containing gas stream are required to adjust the k factor within the limits of the present invention. Thus the content of $O_2$ in the $O_2$-containing gas for this embodiment is preferably 1 to 20.5 vol.-%. Suitable upper limits for the content of $O_2$ in the $O_2$-containing gas are 20, 19.5, 19, 18.5, 18, 17.5, 17, 16.5, 16, 15.5, 15, 14.5, 14, 13.5 or 13 vol.-%. The lower limit of the $O_2$ content in the $O_2$-containing gas can be 1.0, 1.5, 2, 2.5, 3, 3.5, 4, 4.5, 5, 5.5, or 6 vol.-%.

A k-factor approaching stoichiometric combustion of the fuel stream leads to temperatures of the resulting hot flue gas that are considerably higher compared to an oxygen-rich combustion scheme with a low k-factor. Feeding of the inert gas directly or indirectly into the first reaction zone and/or using an $O_2$-containing gas stream having a reduced content of oxygen containing compounds, i.e. to the pre-combustion chamber, has the additional advantage that the temperature of the hot flue gases is thereby reduced to some extent in order to limit thermal stress for the lining of refractory material in the reactor.

The inert gas is preferably nitrogen. The nitrogen can be provided to the process of the present invention from any available sources. It is also possible to use nitrogen gas of low purity as long as the combined amount of components selected from oxygen containing compounds is less than 16 vol.-%. Thus, it is also possible to use nitrogen enriched process gases from the carbon black process or other industrial processes as long as they are purified to the extent to fulfill the above-defined limits of oxygen containing compounds. But as mentioned above it is preferred not to use an inert gas that is derived from the reactor off-gas of the carbon black production process. Inert gas flask bundles or inert gas storage tanks can be connected via lines to the appropriate locations of the furnace reactor employed in the process of the present invention at the suitable feeding points, as discussed above. Alternatively, the inert gas preferably nitrogen can be fed via pipelines from external inert gas production facilities to the process according to the present invention.

Preferably, nitrogen is produced by separating nitrogen from air using any kind of air separation process known to the person skilled in the art. Suitable readily available and economic processes for producing nitrogen of the required purity include pressure swing adsorption processes and membrane separation processes. The pressure swing adsorption process is particularly preferred. Thereby, pressurized air is fed to a pressure swing adsorption unit wherein the oxygen is adsorbed at high pressure in the range of 8 to 12, preferably about 10 bar on a carbon molecular sieve. Thereby, nitrogen of suitable purity (92 to 99.99 vol.-% $N_2$, preferably 95 to 99 vol.-% $N_2$) is obtained. This nitrogen then can be used as inert gas in the process of the present invention. The adsorbed oxygen is desorbed from the carbon molecular sieve at ambient pressure (approximately 1 bar) or reduced pressure. The thus obtained oxygen can be either used in possible subsequent steps in the carbon black production. Alternatively the oxygen can be used in a process other than a carbon black producing process.

Thus, the present invention also relates to an apparatus wherein an inert gas supply unit being a supply line connecting an external inert gas production facility to the apparatus, a storage unit or an air separation unit, preferably a pressure swing adsorption unit or membrane separation unit for separating air into a nitrogen-containing inert gas stream and an oxygen-enriched gas stream is connected to a furnace reactor or to any of the feeding lines for the $O_2$-containing gas, the fuel stream, the carbon black feedstock or the quench material to the reactor in order to feed inert gas to the reactor.

According to a preferred embodiment the apparatus comprises at least one heat exchanger unit for pre-heating the $O_2$-containing stream with the hot reaction mixture leaving the furnace reactor. The inert gas supply unit, preferably the pressure swing adsorption unit or membrane separation unit is connected via a feeding line for the inert gas to the feeding line of the $O_2$-containing stream prior to entry into the heat exchanger.

By using the process of the present invention furnace blacks can be produced that despite their large external surface area (STSA surface area) have a low porosity. The STSA surface area is a measure of the external surface of the carbon black which correlates with particle size. The smaller the carbon black particles, the larger is the external surface area. The BET surface area is a measure of external and internal surface area. As a consequence, the ratio of BET surface area to STSA surface area is an indication for the porosity of the carbon blacks. If the ratio of BET to STSA surface area is approximately 1, the carbon black has no porosity. In general, particularly with carbon blacks having a small particle size and thus a large external surface area or STSA area, also the ratio of BET surface area to STSA surface area significantly deviates from unity indicating that these carbon blacks have a high porosity. Thus, it is a surprising result that the process of the present invention leads to carbon blacks having a large external surface area, but still low porosity.

The furnace blacks according to the present invention have an STSA surface area of 130 $m^2/g$ to 450 $m^2/g$, preferably 140 $m^2/g$ to 300 $m^2/g$, more preferred 150 $m^2/g$ to 280 $m^2/g$, most preferred 160 $m^2/g$ to 250 $m^2/g$.

For the furnace blacks according to the present invention the ratio of BET surface area to STSA surface area is less than 1.1 if the STSA surface area is in the range of 130 $m^2/g$ to 150 $m^2/g$ or 140 $m^2/g$ to 150 $m^2/g$, the ratio of BET surface area to STSA surface area is less than 1.2 if the STSA surface area is in the range of 150 $m^2/g$ to 180 $m^2/g$, and the ratio of BET surface area to STSA surface area is less than 1.3 if the STSA surface area is greater than 180 $m^2/g$. Preferably, the ratio of BET surface area to STSA surface area is less than 1.09 if the STSA surface area is in the range of 130 $m^2/g$ to 150 $m^2/g$, the ratio of BET surface area to STSA surface area is less than 1.15 if the STSA surface area is in the range of 150 $m^2/g$ to 180 $m^2/g$, and the ratio of BET surface area to STSA surface area is less than 1.25 if the STSA surface area is greater than 180 $m^2/g$.

Furthermore, the furnace blacks according to the present invention can have an OAN value of 100-150 ml/100 g A particularly preferred furnace black according to the present invention exhibits an STSA surface area of at least 130 $m^2/g$ wherein
  the ratio of BET surface area to STSA surface area is less than 1.09 if the STSA surface area is in the range of 130 $m^2/g$ to 150 $m^2/g$ or 140 $m^2/g$ to 150 $m^2/g$,
  the ratio of BET surface area to STSA surface area is less than 1.15 if the STSA surface area is greater than 150 $m^2/g$ to 180 $m^2/g$,
  the ratio of BET surface area to STSA surface area is less than 1.25 if the STSA surface area is greater than 180 $m^2/g$;
and an OAN value in the range of 100-150 ml/100 g.

Furthermore, the furnace blacks of the present invention can have an iodine number greater than 125.

The carbon black properties as indicated throughout the present application are measured as follows:
  BET surface area and STSA surface area according to ASTM D-6556 (2014)
  OAN according to ASTM D-2414 (2013)
  Iodine number according to ASTM D-1510 (2013)

It is a further surprising result, that the process according to the present invention allows not only for the control of, particularly the reduction of the porosity of the carbon blacks produced by the process but also to a reduction of the concentration of compounds in the off gas of the reactor, that are considered to be harmful to the environment. Particularly the concentration of $NO_x$ and/or $SO_x$ in the off-gas can be reduced, as will be shown in the experimental data.

A further advantage of the process according to the present invention is that the amount of carbon black formed relative to employed feed stock can be considerably increased compared to furnace processes where the concentration of inert gas in the reactor is not increased. Thus, the process of the present invention is not only suitable to control, i.e. reduce, the porosity of furnace blacks, but in combination or alternatively leads to an improvement of the overall economics of the process indicated by increased carbon black yield. Thereby, also the overall carbon dioxide balance of the process according to the present invention is improved. Thus, the present invention also provides a process for increasing the carbon black yield and for reducing $CO_2$ emissions from the process. As a consequence, a more economic and environmentally acceptable process for producing carbon black is provided.

The present invention will now be explained in more detail with reference to the figures and to the examples.

FIG. 1 shows a schematic representation of the process and the apparatus according to the present invention.

As depicted in FIG. 1, the process according to the present invention is conducted in a furnace reactor 1 having in flow direction three distinct reaction zones. To the first reaction zone 2, also referred to as the combustion zone, a fuel stream comprising combustible material is fed via line 5 and an $O_2$ containing gas stream via line 6. The fuel stream is subjected in the first reaction zone 2 to combustion in order to provide hot flue gases. As shown in FIG. 1, the diameter of the furnace reactor is narrowed, forming a second reaction zone 3 where carbon black feedstock is contacted with the hot flue gases. The carbon black feedstock is fed via line 7 to the second reaction zone 3 in the narrow part of the furnace reactor. This can be achieved by a plurality of radially arranged injection ports like oil lances (not shown). Alternatively or in addition, carbon black feedstock material can also be injected into the second reaction zone 3 via axial lances. In the second reaction zone 3 carbon black is formed by decomposition of the carbon black feedstock material. The thereby produced pyrolysis reaction mixture enters the third reaction zone 4 that is also referred to as the quenching zone. The quench material can be fed to a plurality of positions via the quench material line 8 to the quench zone. In the quenching zone 4 the reaction mixture is cooled down to a temperature that is low enough to essentially terminate the carbon black formation reaction. At this point, the reaction mixture is a dispersion of carbon black particles in a continuous gas phase of the reaction gases. The reaction mixture, after leaving the furnace reactor, is directed to one (FIG. 1) or more heat exchange units 11, in order to further reduce the temperature of the reaction mixture. The heat that is thereby removed from the reaction mixture is used to preheat the $O_2$-containing gas stream prior to entry into the first reaction zone 2. The cold $O_2$-containing gas stream is fed via line 13 to the heat exchange unit 11 and the preheated oxygen-containing gas stream is fed via lines 6 to the first reaction zone 2.

FIG. 1 shows possible positions for feeding the inert gas stream to the reactor. One suitable position is to feed the inert gas from an inert gas storage or production unit 9 via line 10 to line 13 of the cold $O_2$-containing gas prior to entry into the heat exchanger 11. As discussed above, unit 9 is preferably a pressure swing adsorption unit. Alternatively, the inert gas is fed via line 10 to line 6 feeding the preheated $O_2$-containing gas stream to the first reaction zone 2. It is also possible to feed the inert gas stream via line 10 directly to the reactor 1 into the first reaction zone 2. Most preferably, the inert gas stream is fed via line 10 to line 13 of the cold $O_2$-containing gas prior to entry into the heat exchanger 11.

The cooled solid/gaseous reaction mixture leaving the heat exchanger unit 11 is directed to a separation unit 14 where the carbon black particles are recovered from the reaction mixture. The separation unit 14 is preferably a filter unit. The solid carbon black is further conducted to a discharge unit 15 for further processing and storage. The separated gas phase is then also directed to further processing units for cooling and gas treatment before it is released to the environment.

In the examples as presented an apparatus as shown in FIG. 1 is used, wherein the carbon black feedstock is injected via 4 radially oriented oil lances into the second reaction zone 3. As inert gas nitrogen is used that is directly fed to line 13 of the cold $O_2$-containing gas prior to entry into the heat exchanger 11, 12. The process parameters and the properties of the obtained carbon blacks are shown in Table 1.

TABLE 1

|  |  | Example | | |
|---|---|---|---|---|
|  | Unit | CE1 | E1 | E2 |
| Process parameter | | | | |
| k-Factor |  | 0.75 | 0.75 | 1.0 |
| combustion air flow | Nm³/h | 2302 | 2299 | 2302 |
| combustion air temperature | °C. | 651 | 650 | 650 |
| nitrogen gas flow | Nm³/h | 0 | 246.6 | 246.4 |
| fuel (natural gas) flow | Nm³/h | 178.0 | 177.8 | 237.5 |
| carbon black feedstock | kg/h | 493 | 493 | 493 |
| temperature oil lance (A-D) | °C. | 116.5 | 116.5 | 116.4 |
| pre-quench stream | l/h | 657 | 656 | 656 |
| post-quench stream | m³/h | 0.304 | 0.29 | 0.287 |
| temperature reactor exit | °C. | 795 | 794 | 795 |
| temperature pre-combustion chamber measured by IR | °C. | 1786 | 1703 | 1828 |
| molar fraction of CO in the water free tail gas [1] | % | 13.03 | 11.1 | 9.09 |
| sulfur flow in tail gas [2] | kg/h | 1.8 | 1.8 | 1.6 |
| Carbon black properties | | | | |
| Iodine | mg/g | 207.1 | 180.7 | 166.6 |
| BET | m²/g | 186.7 | 159.8 | 146.3 |
| STSA | m²/g | 147.7 | 139.3 | 134.4 |
| BET:STSA |  | 1.26 | 1.15 | 1.09 |
| OAN | ml/100 g | 142.1 | 140.2 | 153 |

[1] Tail gas is extracted from the production line and filtered to remove carbon black. Subsequently the tail gas is cooled to +4° C. to freeze out water and thereafter is passed through phosphorous pentoxide to remove water completely. The water free tailgas composition is analyzed with an Inficon 3000 Micro GC Gas Analyzer to obtain the molar fraction of CO. The Inficon 3000 Micro GC Gas Analyzer is frequently calibrated with specified reference gas.
[2] Sulfur flow in tail gas is calculated via a mass balance. The sulfur flow of carbon black is subtracted from the sulfur flow of the feedstock. The difference is the sulfur flow of tail gas. The sulfur content of feedstock and carbon black is analyzed with an „vario EL cube" CHNS - elemental analyzer from„ Elementar Analysesysteme GmbH. The sulfur flow of feedstock and carbon black is calculated taking into account the mass flows of feedstock and carbon black and the sulfur concentration in feedstock and carbon black.

The invention claimed is:

1. An apparatus for producing of carbon black, comprising
   a) a furnace reactor comprising
      a first reaction zone for generating a hot flue gas stream and at least one line in flow connection with the first reaction zone for feeding an $O_2$-containing gas stream to the first reaction zone and at least one line in flow connection with the first reaction zone for feeding a fuel stream comprising combustible material to the first reaction zone;
      a second reaction zone for contacting the hot flue gas stream with carbon black feed stock, the second reaction zone being downstream of and in flow connection with the first reaction zone, and at least one line in flow connection with the second reaction zone for feeding carbon black feed stock to the second reaction zone; and
      a third reaction zone for terminating a carbon black formation reaction, the third reaction zone being downstream of and in flow connection with the second reaction zone, the third reaction zone comprising means for quenching the carbon black formation reaction; and
   b) an inert gas supply unit; and
   c) at least one line connecting the inert gas supply unit to the reactor or to any of the feeding lines for feeding material to the reactor in order to feed an inert gas stream to the reactor, wherein the inert gas supply unit is a storage unit, an air separation unit, or a supply line connecting an external inert gas production facility to the apparatus.

2. The apparatus of claim 1, further comprising a pre-heater for the oxygen-containing gas stream and/or at least one feeding line in flow connection with the third reaction zone for feeding a quench material to the third reaction zone.

3. The apparatus of claim 1, wherein the air separation unit is a pressure swing adsorption unit or a membrane separation unit and the inert gas supply unit is connected via the at least one line for feeding the inert gas stream to any of:

the line for feeding the $O_2$-containing gas stream, at a location upstream of the pre-heater;
the line for feeding the $O_2$-containing gas stream, at a location down-stream of the pre-heater;
the line for feeding the fuel stream;
the line for feeding carbon black feedstock;
the means for quenching the carbon black formation reaction, in the form of a line for feeding quench material;
the first reaction zone;
the second reaction zone;
the third reaction zone; or
a combination thereof.

4. The apparatus of claim 3, wherein the inert gas supply unit is connected via the at least one line for feeding the inert gas stream to the line for feeding the $O_2$-containing gas stream, at a location upstream of the pre-heater.

* * * * *